Nov. 21, 1967      R. K. BRODERSEN      3,353,414
GYRO SPRING
Filed June 7, 1965

ROLF K. BRODERSEN
INVENTOR.

BY

Thomas W. Kennedy
ATTORNEY

United States Patent Office 3,353,414
Patented Nov. 21, 1967

3,353,414
GYRO SPRING
Rolf K. Brodersen, Orlando, Fla., assignor to General Precision Inc., Little Falls, N.J., a corporation of Delaware
Filed June 7, 1965, Ser. No. 461,967
4 Claims. (Cl. 74—5.4)

The present invention relates to a gyro electromagnetic angular spring, and particularly to a wide-angle gyro electromagnetic angular spring having a substantially constant spring rate.

A prior-art, single-axis gyro of conventional design is comprised of a casing with end wall pivots, a float coaxial therewith supported by said pivots for angular displacement relative to said casing, and a null-seeking spring interconnecting said float and said casing and providing a spring restraint, which acts counter to any angular displacement from said null position.

A prior-art electromagnetic spring is described in United States Patent No. 2,488,734, issued to R. K. Mueller.

One problem with this type of prior-art electromagnetic spring is that it has a parabolic spring-rate curve over a wide range of displacement angle. In certain types of single-axis gyros it is necessary to have a substantially constant spring-rate curve for a wide range of displacement angle.

In accordance with one embodiment of the present invention, an electromagnetic spring, which has a substantially constant spring-rate curve, is provided by placing an adjustable resistor and an adjustable capacitor in series in a circuit with the coil winding of the electromagnetic spring. The capacitor is tuned to set a resonant current in the circuit at null condition; and the resistor is tuned to set the level of such resonant current, so that such tuning permits the calibration of a substantially straight spring-rate curve.

Accordingly, it is one object of the invention to provide a gyro having a casing, and a float displaceable relative thereto, in which said casing exerts a restraining torque on said float, with the torque having a constant spring-rate.

It is another object of the invention to provide an electromagnetic angular spring for use in a single-axis gyro, in which the spring has a constant spring-rate over a wide range of displacement angle.

It is a further object of the invention to provide a gyro having an adjustable type of electromagnetic angular spring for ease of gyro calibration.

To the fulfillment of these and other objects, the invention provides an electromagnetic angular spring comprising a stator, which has four symmetrically disposed poles, and a rotor mounted within said stator, which has a null position with respect to said poles. The rotor is composed of magnetic material and is capable of angular displacement on either side of said null position over a range of not over 45 degrees. The spring is also comprised of a circuit including a stator winding, a power supply, an adjustable resistor and an adjustable capacitor, all of which are connected in series. The stator winding has four coils interconnecting to produce a magnetomotive force pattern in the stator in which the forces are directed inwardly in two adjacent poles and outwardly in the other two poles.

Other objects of the invention will become apparent upon reading the annexed detailed description in connection with the drawings wherein like parts are designated by like numerals throughout the several views, and wherein.

Figure 1:
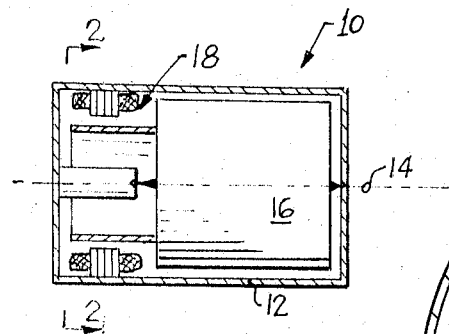
FIG. 1 is a sectional view of a single-axis gyro embodying features of the present invention.

Referring to FIG. 1, one embodiment of the present invention is a gyro 10 (FIG. 1), which is a single-axis rate gyro. Gyro 10 comprises a casing 12, which has a longitudinal precession axis 14, a float 16, which is pivotally connected to casing 12 coaxially therewith, and an electromagnetic spring 18, which interconnects casing 12 to float 16.

Figure 2:
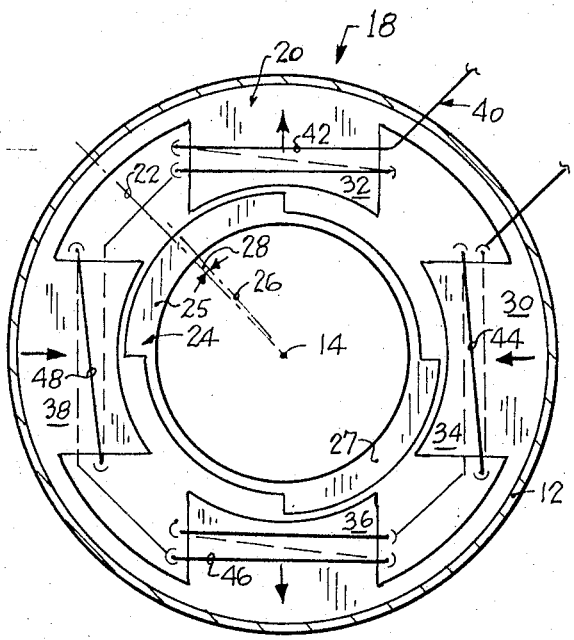
FIG. 2 is a sectional view taken on line 2—2 of FIG. 1.

Spring 18 (FIG. 2) has a stator 20, which is fixedly connected to casing 12 coaxially therewith. Stator 20 has a radial reference axis 22. Spring 18 also has a rotor 24, which is fixedly connected to float 16 coaxially therewith. Rotor 24 also has a radial reference axis 26, and rotor 24 also has opposite poles 25 and 27. Axes 22 and 26 are separated by an angle of displacement 28. Casing 12 and float 16 are in a null position relative to each other when angle 28 equals zero degrees.

Stator 20 (FIG. 2) has a ring 30, which is made of a stack of laminated sheets. Ring 30 has four radially-inwardly-pointing poles 32, 34, 36, 38. Stator 20 also has a primary winding 40, which includes four coils 42, 44, 46, 48, that are connected in series and that are respectively wound on poles 32, 34, 36, 38. Poles 32, 34, 36, 38 have respective arcuate lengths on their radially-inner faces not less than 70 degrees; and rotor poles 25, 27 have slightly longer arcuate lengths on their radially-outer faces.

Figure 3:
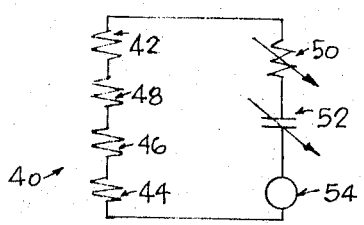
FIG. 3 is a schematic circuit embodying features of the present invention.

Winding 40 (FIG. 3) is connected in series with an adjustable resistor 50, and with an adjustable capacitor 52, and with a power source 54. Resistor 50 can be tuned to vary its resistance level; and capacitor 52 can be tuned to vary its capacitance level. Power source 54 preferably has a standard frequency.

With this construction of embodiment 10, capacitor 52 can be adjusted or tuned to a particular capacitance level that provides a peak-power resonant current in winding 40 corresponding to the standard frequency level of power source 54. Such adjustment is made while rotor 24 is at its null position so that the current level in winding 40 is reduced when rotor 24 is displaced from its null position. Then, resistor 50 is tuned, while rotor 24 is still at null, to a resistance that sets the peak resonant current level which corresponds with the most suitable straight line spring-rate curve.

Figure 4:
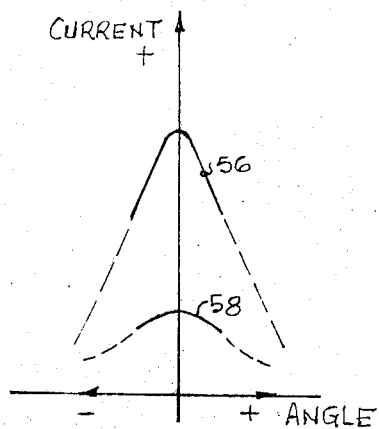
FIG. 4 is a curve of current vs. displacement angle.

FIG. 4 illustrates the variation in current in winding 40 vs. the rotor displacement angle 28. Curves 56, 58, which are approximate upper-limit and lower-limit curves, indicate the variation in current in winding 40 vs. the rotor displacement angle 28 for two extreme settings of resistor 50. Curve 56 has a high-peak resonant current for a low resistance; and curve 58 has a low-peak resonant current for a high resistance.

Figure 5:
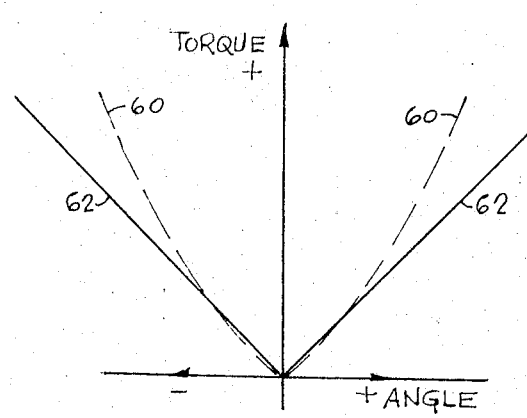
FIG. 5 is a curve of torque vs. displacement angle.

FIG. 5 illustrates the variation of elastic-restraint torque vs. displacement angle 28. Such torque is assumed to be positive in value if it tends to return rotor 24 to its null position. Angle 28 is assumed to be positive for clockwise rotor rotation and to be negative for counter-clockwise rotor rotation from its null position. Curve 60 is a parabolic-shaped prior-art torque vs. angle curve. Curve 62 is a straight-line torque vs. angle curve according to the invention. Curve 62 indicates the straight-line spring-rate curve of spring 18 according to the invention.

In summary gyro 10 according to the invention provides a null-seeking electromagnetic spring on its float. Said spring has a constant spring rate over a wide range of angular displacement and said spring is adjustable after gyro assembly for ease of calibration.

While the present invention has been described in a preferred embodiment, it will be obvious to those skilled

What is claimed is:
1. An electromagnetic angular spring comprising:
   a stator having four symmetrically disposed poles;
   a rotor of magnetic material mounted within the stator and having a null position with respect to the poles, the rotor being capable of angular displacement over a range of displacement angle approaching 45 degrees on either side of said null position; and
   a circuit including a stator winding, a power supply, an adjustable resistor and an adjustable capacitor connected in series, said winding having four coils respectively wound on said poles and interconnected for producing a magnetomotive force pattern in the stator in which the forces are directed inwardly in two adjacent poles and outwardly in the other two poles,
   whereby the adjustable capacitor can be tuned when said rotor is at its null position for providing a resonant current level at said power supply frequency and the adjustable resistor can be tuned for selecting a current level of optimum linearity and suitable strength with a symmetrical slope on either side of said null position so that a substantially straight-line spring rate is provided.

2. A single-axis rate gyro comprising:
   a casing having an axis of precession;
   a float coaxial therewith along said precession axis; and
   an electromagnetic spring comprising a stator fixedly attached to said casing and having four symmetrically disposed poles; a rotor of magnetic material fixedly attached to said float and mounted within the stator, said rotor having a null position with respect to the poles of said stator and being capable of angular displacement over a range of displacement angle approaching 45 degrees on either side of said null position; and
   a circuit including a stator winding, a power supply, an adjustable resistor and an adjustable capacitor connected in series, said winding having four coils respectively wound on said poles and interconnected for producing a magnetomotive force pattern in the stator in which the forces are directed inwardly in two adjacent poles and outwardly in the other two poles,
   whereby the adjustable capacitor can be tuned when said rotor is at its null position for providing a resonant current level at said power supply frequency and the adjustable resistor can be tuned for selecting a current level of optimum linearity and suitable strength with a symmetrical slope on either side of said null position so that a substantially straightline spring rate is provided.

3. A method of calibrating a gyro electromagnetic spring having a two-pole rotor and a four-pole stator and having a stator winding providing a magnetomotive force pattern in which two poles have inwardly-pointing forces and two poles have outwardly-pointing forces, including the steps of:
   providing a power source connecting to the stator winding;
   adjusting a variable capacitor connecting in series to the stator winding and the power source so that a resonant current level is provided with the rotor at a null position relative to the stator; and
   adjusting a variable resistor connecting in series to the stator winding and to the power source and to the variable capacitor so that the current level provides a sufficient spring strength and so that the variation of current vs. displacement angle is linear on each side of said null position whereby the spring provides a straight-line spring rate over a wide angle of displacement on either side of said null position.

4. A spring as claimed in claim 1, in which said stator poles have respectively radially-inner faces with arcuate lengths not less than 70 degrees, and the rotor poles have respective radially-outer faces with arcuate lengths substantially longer than the corresponding stator pole faces.

References Cited

UNITED STATES PATENTS

| | | | |
|---|---|---|---|
| 2,448,734 | 11/1949 | Mueller | 336—135 |
| 2,630,561 | 3/1953 | Mueller | 336—135 |
| 2,842,749 | 7/1958 | Bonnell | 336—135 |

MILTON KAUFMAN, *Primary Examiner.*

FRED C. MATTERN, CORNELIUS J. HUSAR,
*Examiners.*

J. D. PUFFER, *Assistant Examiner.*